3,205,216
POLYMERIZATION PROCESS WITH ZIEGLER CATALYSTS
Robert J. McManimie and Edward H. Mottus, St. Louis, Mo., and Harry G. Hurst, Dayton, Ohio, assignors to Monsanto Company, a corporation of Delaware
No Drawing. Filed Apr. 5, 1962, Ser. No. 185,201
12 Claims. (Cl. 260—94.9)

This application is a continuation-in-part of our co-pending application Serial No. 586,352, filed May 22, 1956, and now abandoned.

This invention relates to Ziegler catalysts. In one particular embodiment the invention relates to the storage of Ziegler catalysts. In other embodiments, the invention relates to the use of Ziegler catalysts to effect chemical reactions, especially polymerizations. In certain preferred aspects the invention pertains to the production of high density polyethylene by polymerizing ethylene in the presence of a catalyst exemplified by the material obtained by the interaction of a trialkyl-aluminum with titanium tetrachloride, said catalyst having been stored under specified conditions.

There has recently come into commercial prominence the polymerization of ethylene and other monomers through the agency of a type of catalyst advanced by Prof. Dr. Karl Ziegler of the Max Planck Institute at Mulheim, Ruhr, Germany. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkyl-aluminum with a compound of a metal of Group IV–B, V–B or VI–B of the Periodic System, including thorium and uranium, and especially compounds of titanium, zirconium and chromium. These, and the variety of other catalysts of the Ziegler type, can be considered exemplified by the catalysts obtained by the interaction of a trialkylaluminum with titanium tetrachloride. Other catalysts of the Ziegler type differ from those disclosed in the above-mentioned Belgian Patent No. 533,362 in various ways, for example, as follows. Instead of or in addition to the aluminum trialkyls, catalysts of the type described in the Belgian patent can be made by reacting the various compounds of Groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of Groups IV–B, V–B or VI–B metals. Another Ziegler type catalyst is prepared by the interaction of an aluminum compound of the general formula $R_2AlX$ where R is a hydrocarbon radical such as alky or aryl, and X is a halogen, such as chlorine, or bromine, with a compound of a metal of Group VIII of the Periodic System, e.g., iron, nickel, cobalt, or platinum, or maganese, for example dimethylaluminum monobromide plus ferric chloride, diisobutylaluminum chloride plus nickel (trivalent) chloride, diethylaluminum monochloride plus manganic chloride. Yet another combination is that of the Group IV–B, V–B or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the Group IV–B, V–B and VI–B heavy metals as previously mentioned, combined with the alkali metal alkyls, for example with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example butyl lithium plus zirconium tetrachloride, sodium tetramethylaluminum plus titanium tetrachloride or plus thorium acetylacetonate. Other Ziegler type catalysts are prepared by using (in conjunction with compounds of Group IV–B, V–B or VI–B metals), instead of trialkylaluminums, triaryl-, triaralkyl-, trialkaryl- or mixed alkyl- and arylaluminum, zinc, magnesium or alkali metals, e.g., phenyl sodium plus $TiCl_4$.

Those skilled in the art having knowledge of these matters, refer to catalysts of the foregoing type as Ziegler or Ziegler-type catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the Group IV–B, V–B and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Belgian Patent 538,782, issued jointly to Montecatini Societa Generale per l'Industria Mineraria e Chimica Anonima and Professor Dr. Karl Ziegler, disclosing the polymerization of olefins having at least 3 carbon atoms in the molecule, and their copolymerization with each other and with ethylene, using a variety of Ziegler catalysts; olefins, especially α-olefins, disclosed in said Belgian Patent 538,782 include propylene, butylene, isobutylene, pentylene, hexylene, vinyl cyclohexene and styrene. Substantially the same disclosure is found in Australian patent application 9,651/55 also filed by Montecatini and Ziegler jointly. Catalysts of the said Belgian Patent 538,782 and Australian application 9,651/55 are obtained by reaction of compounds of metals of the left-hand column of the 4th to 6th groups of the periodic table of elements, including the thorium and uranium groups, with metals, alloys, metal hydrides, or metal-organic compounds of metals of the 1st to 3rd groups of the periodic table.

It will be seen from the foregoing that a large variety of co-reactants can be employed which by interaction with each other result in the formation of a Ziegler catalyst. It is generally considered that the Ziegler catalysts are obtained by interaction of a polyvalent metal compound with another metal in elemental or combined form resulting in reduction of the valence state of the first said metal. The resulting polymetal Ziegler catalyst is believed to act as a heterogeneous catalyst, i.e., at least some of the product obtained by the interaction of the materials in question is present in solid form although often in such finely divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid. The essence of the present invention, however, is not to be found in the particular Ziegler type catalyst employed but rather in the method used to store such catalyst, with consequent advantages when used to catalyze a variety of chemical reactions, polymerization of ethylenically unsaturated monomers being of particular interest.

Ziegler catalysts can be employed to catalyze a variety of chemical reactions, for example the chlorination of benzene to produce mono- and polychlorobenzenes, especially ortho- and para-dichlorobenzene. The reaction of most intense commercial interest at the present time is polymerization. The present invention is broadly applicable to all Ziegler catalysts, and their use in all chemical reactions catalyzed thereby, and insofar as polymerization is concerned is broadly applicable to all Ziegler type polymers, i.e., all polymers prepared by polymerizing a monomer or mixture of monomers in the presence of a Ziegler type catalyst. A monomer which can be so polymerized can properly be called a Ziegler-polymerizable monomer. Of especial interest, of course, are those Ziegler solid polymers of sufficiently high molecular weight to be useful in the plastics industry, but the benefits of the invention are obtainable in preparing lower molecular weight Ziegler semi-solid and even liquid polymers which can be used, for example, in adhesives, as lube oil additives, etc. The preferred polymers have a molecular weight of at least 2,000 and preferably 10,000. Those Ziegler polymers to which the preparaton of the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941) and J.A.C.S. 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene, or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene, homopolymers of isoprene, and copolymers of butadiene with isoprene, as prepared by the use of Ziegler type catalysts are also of great interest, having exceptional low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, vinylnaphthalene, vinyl aromatic hydrocarbons generally, etc. Styrene when polymerized in the presence of Ziegler type catalysts gives a high molecular weight polymer showing a crystalline structure by X-ray diffraction examination. Ziegler type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers, can also be prepared by the action of Ziegler catalysts, as disclosed in the application of Earl W. Gluesenkamp, Serial No. 507,717, filed May 11, 1955, now U.S. Patent 3,026,290, issued March 20, 1962. A variety of copolymers of the various monomers named above with each other and with other comonomers can be prepared by Ziegler catalysis, and the present invention in its broadest scope includes all such and in fact all polymers prepared through the agency of Ziegler type catalysts on any single monomer or mixture of monomers polymerizable with such catalysts. Despite the broad scope of the invention, it will be found more convenient in most of the present application to discuss the invention with specific reference to preferred embodiments thereof, and accordingly, Ziegler type polyethylene will be especially referred to by way of example. Likewise referred to especially by way of example will be catalysts prepared by the interaction of a trialkylaluminum with titanium tetrachloride, this being the preferred example of the preferred group of Ziegler catalysts which are those prepared by interaction of (a) an aluminum compound of the general formula $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium and zirconium.

Ziegler catalysts, for whatever use desired, can be prepared in the vessel in which the catalyzed reaction is to be carried out, or can be prepared in one vessel and then transferred to the intended reaction vessel, and in either event can either be used immediately after preparation, or after a period of time elapses between the preparation of the catalyst and its subsequent use to catalyze, e.g., polymerization. There are certain practical advantages in preparing a considerable quantity of a Ziegler catalyst, and then storing same and using the stored catalyst as a stock from which to draw portions thereof for use in a series of batch reactions or over an extended period of time in a continuous reaction. Not only is the number of catalyst preparations minimized, but uniformity in the ratio of the materials going into making the Ziegler catalyst is thus assured. Further, in effecting Ziegler polymerizations it has been found that preparation of the catalyst in the vessel in which the polymerization is to be conducted tends to result in more severe "plating" of polymer on the surfaces of the reaction vessel, heat exchange surfaces within the vessel, stirrers and the like, than occurs when the catalyst is first prepared in a separate vessel and then a portion or all of the catalyst is transferred into the polymerization vessel for use.

However, Ziegler catalysts on standing, i.e., during storage, tend to undergo certain changes, the nature of which is not well understood, but which result in various disadvantages. Possibly the most undesirable effect of storing or "aging" Ziegler catalysts is loss of catalytic activity. Thus, Ziegler catalyst allowed to stand at room temperature for one day prior to its use is found to have a significantly lower activity, as measured for instance by the weight of monomer, e.g., ethylene, whose polymerization can be effected by a given weight of the catalyst in a given period of time, than the same catalyst if used immediately after preparation. The loss in catalyst activity continues to be more severe if the storage period is extended. The lessened activity is noted not only in polymerizations but also in other reactions catalyzed by Ziegler catalysts. Another important effect of aging Ziegler polymerization catalysts is that the longer the aging period, the higher the molecular weight of the resulting polymer, as reflected by specific viscosity and flowability, e.g., melt index. While in some instances it will be desired to obtain an increased molecular weight by deliberately aging the catalyst, in most instances it is difficult to obtain a polymer of sufficiently low molecular weight to have desirable flow properties and hence in these cases aging of catalyst is a marked disadvantage.

In accordance with the present invention, one or more of the foregoing undesirable effects, the particular effects varying somewhat from case to case, are reduced or completely obviated by storing Ziegler catalyst at temperatures below about 10° C. For fairly long storage periods, temperatures below about −25° C. are preferred. The principal, but not necessarily the only, desirable results obtained by the practice of the invention can be summarized as follows. In using Ziegler catalyst which has been stored, the loss of catalyst activity mentioned hereinbefore is inhibited by maintaining the catalyst at temperatures below 10° C. during said storage. For example, with a given Ziegler catalyst as will be shown in the specific examples hereinafter, storage at 5° C. over a period of many days resulted in oly a very small loss in activity of the catalyst, compared to a very severe loss in activity of the same catalyst stored at room temperature. Further, storage at still lower temperatures, e.g., below −25° C. permits the maintenance of full catalyst activity over extended periods of time. It was pointed out above that use of stored Ziegler catalyst yields polymer of increased molecular weight. This increase in molecular weight, over that obtained when using fresh catalyst, is minimized by storing the catalyst at temperatures below 10° C. in accordance with the present invention, and is minimized still more by storing the catalyst below −25° C.

It is often desirable to prepare Ziegler catalysts at low temperatures, such as below −25° C., as described and claimed in the copending application entitled "Improvements in Preparation and Use of Ziegler Catalysts," Serial No. 586,353, filed May 22, 1956. Such catalyst has more uniform activity during use, e.g., polymerization, than does ordinary Ziegler catalyst, and is easier to remove from reaction products, e.g., by contact with alcohols at room temperature or somewhat above. On the other hand, Ziegler catalysts prepared at say room temperature, or somewhat lower or higher than room temperature, are quite satisfactory for many purposes. It may also be pointed out that some Ziegler catalysts are desirably prepared at elevated temperatures, say 50 to 80° C. The present invention can be successfully practiced with Ziegler catalyst prepared at any temperature. In other words, Ziegler catalyst which is to be stored is first prepared at any temperature that is convenient or preferred, which in many but not all instances, will be below −25° C., and is then held at below 10° C. for at least part of the storage period. Of course the advantages of the invention are realized to an extent that is somewhat dependent on the storage period, and if this is at least several hours, say 5 hours or more, it is quite important that the invention be practiced in order to minimize the undesirable effects heretofore mentioned. Best results are obtained by holding the catalyst below 10° C. throughout the storage period, and substantially immediately thereafter employing the thus-stored catalyst to effect a desired chemical reaction, e.g., polymerization of a Ziegler-polymerizable monomer.

More detailed information will now be given on preferred procedures and components for preparing various Ziegler catalysts. We prefer catalysts prepared by the interaction of (a) an aluminum compound of the general formula $R_2AlX$ where R is an alkyl, cycloalkyl, or aryl radical and X is hydrogen, halogen or an alkyl, cycloalkyl or aryl radical, with (b) a metal halide selected from the group consisting of the chlorides, bromides and iodides of titanium and zirconium. The preparation of polymers will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-(β-phenylethyl) aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri-, and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.1:1 to 10:1 on up to 15:1 or higher. It is generally preferred to use an Al:Ti mol ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquified propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane. In some instances it is also advantageous to prepare the catalyst in the presence of a monomer; for example if the catalyst is prepared in the presence of monomeric styrene, and then used to polymerize styrene, a high proportion of crystalline polystyrene results.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced. These inert solvents, which are solvents for the monomers, some of the catalyst components, and some of the polymers, but are non-solvents for many of the polymers, e.g., polyethylene, can also properly be termed inert liquid diluents.

The amount of catalyst required is dependent on the other variables of the particular reaction, such as the polymerization reaction, and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer or monomers, the presence or absence of solvent, the temperatures, pressures, and other reaction conditions. When polymerization is effected in the presence of a solvent, the catalyst to solvent weight ratio should be at least about 0.003:1.

The polymerization can be effected over a wide range of temperatures, again the particular preferred temperature being chosen in accordance with the monomer, pressure, particular catalyst and other reaction variables. For many monomers from room temperature down to say minus 40° C. and even lower are suitable, and in many cases it is preferred that the temperature be maintained at below about 35° C. However, for other monomers, particularly ethylene, higher temperatures appear to be optimum, say from 50 to 75° C. for ethylene. Temperatures ranging up to 100° C. and higher are generally satisfactory for Ziegler type polymerization.

The pressure at which the polymerization is carried out is dependent upon the chosen monomer or monomers, as well as other variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The monomers and diluents or solvents, if used, need not be pure so long as they are reasonably free from poisons. However, best results are ordinarily obtained if the monomer feed contains at least 90 weight percent and preferably higher of the polymerizable monomer, exclusive of any solvent material. It is well to protect the catalyst during preparation, storage, and use by blanketing with an inert gas, e.g., nitrogen, argon or helium.

The monomer or mixture of monomers is contacted with the catalyst in an convenient manner, preferably by bringing the catalyst and monomer together with intimate agitation provided by suitable stirring or other means. The agitation can be continued during the polymerization, or in some instances the polymerization mixture can be allowed to remain quiescent while the polymerization takes place. In the case of the more rapid reactions with the more active catalysts, means can be provided for refluxing monomer and solvent if any of the latter is present, and thus remove the heat of reaction. In any event adequate means should be provided for dissipating the exothermic heat of polymerization. If desired, the monomer can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

The polymer will be recovered from the total reaction mixture by a wide variety of procedures, chosen in accordance with the properties of the particular polymer, the presence or absence of solvent and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobutanol, secondary butanol, say at temperatures of 85 to 100° C., or by various other procedures. If the polymer is insoluble in the solvent, it can be separated therefrom by filtration, centrifuging or other suitable physical separation procedure. If the polymer is soluble in the solvent, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low-boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably well below 100° C.

The foregoing principles and procedures can be applied, with suitable modification when necessary, to reactions other than polymerizations, effected in the presence of Ziegler catalysts.

In order to illustrate some of the various aspects and advantages of the invention, the following examples are given. It will of course be understood that variations from the particular catalyst components, reactants, solvents, proportions, temperatures and the like can be made without departing from the invention.

*Example I*

Activity of catalysts stored at various conditions was determined by the rate at which ethylene was polymerized to high molecular weight high density polyethylene at standardized conditions. A tubular type reactor, 2½ inches in diameter and of 500 ml. capacity, was used. It was fitted with side arms for addition of liquids and withdrawal of gas, a thermometer well, and a paddle-type hollow stem stirrer. Gas was passed through an inlet flow meter into the stirrer shaft, and flowed out into the reaction mixture at the tip of the stirring blade. The off-gas was passed through a spiral condenser and a Dry Ice (solid $CO_2$) trap to an outlet flow meter.

The apparatus was baked dry, assembled and flushed with lamp grade nitrogen. Passage of nitrogen was continued until the reaction temperature was attained. The calculated amount of premixed and stored catalyst was transferred with a pipette to the reactor, and enough kerosene was added to bring the volume to 250 ml. The kerosene used in the reaction vessel and in preparation of the catalyst had been highly purified by extensive acid washing. Stirring was started and the mixture was heated to 65° C., heating was discontinued and the gas inlet was switched from nitrogen to ethylene. The inlet and outlet flow meters were read at 1-minute intervals. The reactor was cooled with air blast as needed to maintain a temperature of 65° C. plus or minus 2° C. A standard run time of 12 minutes was used throughout.

The ethylene flow was maintained at such a level that an appreciable excess of ethylene was always passing through the reactor. The difference in the flow meter readings was then plotted against time in minutes and the area under the curve was calculated by the method of counting squares. The direct relation between the area and the weight of polymer had been established from a large number of samples that had been worked up and weighed.

Catalyst was prepared as a slurry in kerosene in a 3-neck Morton flask well flushed with nitrogen by means of a nitrogen inlet and outlet and equipped with a high speed stirrer assembly. The apparatus was first baked dry and flushed with lamp grade nitrogen. Most of the kerosene to be used was then placed in the flask and the requisite quantity of triisobutylaluminum was added and washed into the flask with additional kerosene. The mixture was then cooled to a temperature below −30° C. by immersing the flask in a bath of solid $CO_2$ and acetone. The requisite quantity of $TiCl_4$ was then added dropwise over a 15 minute interval. The $TiCl_4$ addition funnel was then washed into the flask with the final quantity of kerosene. Catalyst stored for a short period of time was stored under nitrogen in the vessel in which it was prepared, and for longer storage periods was transferred to a bottle and stored under nitrogen. When catalyst was to be tested, the catalyst slurry was well mixed and then by means of a pipette aliquots were transferred under nitrogen from the vessel or bottle into the reactor.

In each instance, the catalyst components were employed in amounts to give an initial concentrated catalyst slurry containing 173 millimoles titanium per liter of kerosene, which when diluted in the polymerization reactor with additional kerosene gave a concentration of 13.8 millimoles titanium per liter of kerosene. The mole ratio of aluminum to titanium was 0.5.

The catalyst preparation for the following test was carried out at <−30° C. as described above. It was then stored for the designated times at the designated temperatures, before being subjected to the 12-minute polymerization activity test described above. Results of the activity test are reported in grams polymer/hour/liter of reaction mixture.

| Age of Catalyst | Temp. Storage,° C. | Twelve Minute Activity of Catalyst, g./hr./l. | Spec. Visc. of Polymer, 0.1% in 100° C. Xylene |
|---|---|---|---|
| 2.5 hrs | −78 | 369 | 0.178 |
| 6 days | 27 to 35 | 23 | |
| 6 days | −78 | 306 | 0.211 |
| 6 days | +5 | 310 | 0.202 |
| 14 days | +5 | 314 | 0.284 |
| 37 days | +5 | 289 | 0.312 |
| 50 days | +5 | 269 | 0.271 |

The foregoing data clearly show that storage at room temperature (27–35° C.) for 6 days resulted in practically complete loss of catalyst activity, whereas storage at +5° C. greatly inhibited the loss of catalyst activity on aging. The loss of activity occurring at 5° C. was comparatively slight, even though the period of time was quite great and much more than would normally be encountered in the practical use of the catalyst. It will also be noted that the molecular weight of the polymer produced increased with age of the catalyst but this effect was moderate. Storage at −78° C. gave comparable results.

*Example II*

By the general procedures described in Example I, applicability of the invention to a variety of other Ziegler catalyst systems was established. The polymerization reactor was a two-liter vertical glass resin pot having a jacket through which water for temperature control was passed. It was fitted by ground glass joint with a head provided with openings for addition of gases and liquids, withdrawal of gases, a thermometer well and a stirrer. Ethylene was passed through an inlet flow meter and then under the surface of the liquid in the reactor. Off gas was passed through a condenser and Dry Ice trap to an outlet flow meter. However, instead of employing the flow meter readings to calculate conversion as in Example I, the polymer product itself was recovered and weighed.

All apparatus was baked dry, assembled and flushed with pre-purified nitrogen. Catalyst was prepared as a slurry in one liter of hexane, and then 100 milliliter aliquots were used in the polymerization runs. The catalyst was prepared at room temperature (24° C.) in an ordinary stirred flask protected by a flow of nitrogen. The titanium halide in amount of 173 millimoles was syringed into one liter of hexane, and then 86.5 millimoles of the alkyl aluminum compound was introduced in the same way. Thus the mol ratio of aluminum to titanium was 0.5. Catalyst used after 20 minutes aging was withdrawn directly from the preparation flask where it had been kept under nitrogen, while catalyst to be used after long storage periods was transferred to bottles and stored under nitrogen. After the desired storage period, the catalyst slurry was well mixed and then aliquots were pipetted under nitrogen into the reactor.

In each polymerization run, a 100 milliliter aliquot of the catalyst was pipetted into 1100 milliliters hexane in the reactor. Temperature was maintained at about 63° C. during the 12 minute polymerization run. As in Example I, an excess flow of ethylene was maintained at all times during the run, and flow of nitrogen and ethylene were also as described in Example I. Polyethylene product was recovered by quenching the reaction mixture with 100 milliliters isopropanol, filtering at 30° C., washing twice with isopropanol, refluxing one hour in isopropanol, and finally washing twice more with isopropanol. After drying in a vacuum oven, the polyethylene was weighed, and grams polymer per hour per liter of reaction mixture was calculated.

The data are shown in the following tabulation:

DIETHYLALUMINUM CHLORIDE/TITANIUM TETRACHLORIDE

| Age of Catalyst | Activity of Catalyst, g./hr./l. | | Spec. Visc. of Polymer, 0.1% in 130° C. Tetralin |
|---|---|---|---|
| | Aged at Room Temp. (24° C.) | Aged at 5° C. | |
| 20 minutes | 69 | | 0.112 |
| 3 days | | 20 | 0.223 |
| 6 days | | 46 | 0.152 |

DIISOBUTYLALUMINUM HYDRIDE/TITANIUM TETRACHLORIDE

| 20 minutes | 98 | | 0.117 |
|---|---|---|---|
| 15 days | | 2 | 0.348 |
| 16 days | | 39 | 0.377 |

DIISOBUTYLALUMINUM HYDRIDE/TITANIUM TETRABROMIDE

| 20 minutes | 101 | | 0.251 |
|---|---|---|---|
| 16 days | | 11 | 0.390 |
| 17 days | | 99 | 0.341 |

The foregoing data clearly show that a severe loss of catalyst activity occurring on storage at room temperature is greatly minimized by storage at 5° C. These effects occur regardless of which halide of titanium is used, and regardless of whether the alkyl aluminum compound be a trialkylaluminum as in Example I or a dialkylaluminum halide or hydride, and regardless of the alkyl groups on the aluminum. It will also be seen that the increase in molecular weight of the polymer that results from use of stored catalyst was not as severe when the catalyst was stored at 5° C. in the case of diethylaluminum chloride/titanium tetrachloride and diisobutylaluminum hydride/titanium tetrabromide catalysts.

While the invention has been described with particular reference to preferred embodiments thereof, it will be appreciated that variations from the details given herein can be effected without departing from the invention in its broadest aspects.

We claim:

1. Method which comprises first preparing a catalyst by the interaction of a trialkylaluminum with titanium tetrachloride, then storing same below 10° C. for at least 5 hours, and then polymerizing an ethylenically unsaturated monomer polymerizable thereby in the presence of the thus-stored catalyst.

2. Method which comprises first preparing a catalyst by the interaction of a trialkylaluminum with titanium tetrachloride, then storing same for a period of at least 5 hours while maintaining same below 10° C. throughout said storage period, and substantially immediately thereafter employing the thus-stored catalyst to effect the polymerization of ethylene.

3. Method which comprises first preparing a catalyst by the interaction of (a) an aluminum compound of the general formula $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium, then storing same below 10° C. for at least 5 hours, and then polymerizing an ethylenically unsaturated monomer polymerizable thereby in the presence of the thus-stored catalyst.

4. Method according to claim 3 wherein said monomer is ethylene.

5. Method according to claim 3 wherein said catalyst is prepared and stored as a dispersion in an inert hydrocarbon liquid, and wherein ethylene as said monomer is polymerized in the presence of said dispersion.

6. Method which comprises first preparing a catalyst by the interaction of (a) an aluminum compound of the general formula $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium, then storing same for a period of at least 5 hours while maintaining same below 10° C. throughout said storage period, and substantially immediately thereafter employing the thus-stored catalyst to effect the polymerization of an ethylenically unsaturated monomer polymerizable thereby.

7. Method according to claim 6 wherein said monomer is ethylene.

8. Method according to claim 3 wherein the catalyst is stored below −25° C.

9. Method according to claim 2 wherein the catalyst is stored below −25° C.

10. Method according to claim 3 wherein (a) is a dialkylaluminum halide.

11. Method according to claim 3 wherein (a) is a dialkylaluminum hydride.

12. Method according to claim 3 wherein (b) is titanium tetrabromide.

References Cited by the Examiner

UNITED STATES PATENTS 2,824,090  2/58  Edwards et al. _____ 260—94.9

FOREIGN PATENTS 218,210  11/58  Australia.

JOSEPH L. SCHOFER, *Primary Examiner.*